United States Patent
Zheng et al.

(10) Patent No.: US 10,203,660 B2
(45) Date of Patent: Feb. 12, 2019

(54) HOLOGRAPHIC REPRODUCING APPARATUS AND METHOD, HOLOGRAPHIC IMPLEMENTING DEVICE AND METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaoyi Zheng, Beijing (CN); Junwei Wang, Beijing (CN); Hongtao Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/989,870

(22) Filed: May 25, 2018

(65) Prior Publication Data
US 2018/0275605 A1    Sep. 27, 2018

Related U.S. Application Data

(63) Continuation-in-part of application No. 14/359,027, filed as application No. PCT/CN2013/087073 on Nov. 13, 2013.

(30) Foreign Application Priority Data

Jul. 19, 2013    (CN) .......................... 2013 1 0306590

(51) Int. Cl.
G03H 1/00    (2006.01)
G03H 1/02    (2006.01)
(Continued)

(52) U.S. Cl.
CPC ......... *G03H 1/024* (2013.01); *G02B 27/0977* (2013.01); *G02B 27/12* (2013.01);
(Continued)

(58) Field of Classification Search
None
See application file for complete search history.

(56) References Cited

U.S. PATENT DOCUMENTS 3,683,772 A * 8/1972 Jones ..................... G03B 35/04
                                                                352/69
5,570,207 A    10/1996 Chang
(Continued)

FOREIGN PATENT DOCUMENTS

CN    101276197 A    10/2008
CN    101794111 A    8/2010
(Continued)

OTHER PUBLICATIONS

The First Chinese Office Action dated Jul. 3, 2015; Appln. No. 201310306590.6.
(Continued)

*Primary Examiner* — Jennifer D. Carruth
(74) *Attorney, Agent, or Firm* — Ladas & Parry LLP

(57) ABSTRACT

The present disclosure relates to a holographic reproducing apparatus comprising: a light source configured to supply a reproducing light beam to be incident to a photorefractive crystal, wherein the photorefractive crystal has holographic images recorded therein in a plurality of different angles respectively; a reflective mirror configured to reflect the reproducing light beam emitted from the light source to the photorefractive crystal; and a driving mechanism connected to the reflective mirror and configured to drive the reflective mirror to move on a plane elliptical arc, the plane elliptical arc is defined by using the light source and the photorefrac-
(Continued)

tive crystal as two mathematical focuses and using a predetermined constant, so that an incident angle of the reproducing light beam to be incident to the photorefractive crystal varies to form a plurality of reproducing light beams in different angles to be incident to the photorefractive crystal in sequence.

9 Claims, 3 Drawing Sheets

(51) Int. Cl.
*G02B 27/09* (2006.01)
*G02B 27/12* (2006.01)

(52) U.S. Cl.
CPC .............. *G03H 2001/0212* (2013.01); *G03H 2001/0216* (2013.01); *G03H 2001/0268* (2013.01)

(56) References Cited

U.S. PATENT DOCUMENTS

| | | |
|---|---|---|
| 2009/0168074 A1 | 7/2009 | Monchalin et al. |
| 2010/0165426 A1 | 7/2010 | Kihara et al. |
| 2012/0300608 A1 | 11/2012 | Masumura |
| 2014/0198360 A1 | 7/2014 | Zheng et al. |

FOREIGN PATENT DOCUMENTS

| | | |
|---|---|---|
| CN | 103064275 A | 4/2013 |
| CN | 103365196 A | 10/2013 |
| CN | 203444248 U | 2/2014 |
| JP | 2012-252068 A | 12/2012 |
| WO | 2008/121158 A1 | 10/2008 |

OTHER PUBLICATIONS

International Search Report dated Apr. 3, 2014; PCT/CN2013/087073.
International Preliminary Report on Patentability dated Jan. 19, 2016; PCT/CN2013/087073.
USPTO NFOA dated Dec. 31, 2015 in connection with U.S. Appl. No. 14/359,027.
USPTO FOA dated May 17, 2016 in connection with U.S. Appl. No. 14/359,027.
USPTO NFOA dated Oct. 17, 2016 in connection with U.S. Appl. No. 14/359,027.
USPTO FOA dated Feb. 8, 2017 in connection with U.S. Appl. No. 14/359,027.
USPTO NFOA dated Jun. 9, 2017 in connection with U.S. Appl. No. 14/359,027.
USPTO FOA dated Nov. 29, 2017 in connection with U.S. Appl. No. 14/359,027.
USPTO AA dated Feb. 16, 2018 in connection with U.S. Appl. No. 14/359,027.

* cited by examiner

HOLOGRAPHIC REPRODUCING APPARATUS AND METHOD, HOLOGRAPHIC IMPLEMENTING DEVICE AND METHOD

RELATED APPLICATION

This application is a continuation-in-part of U.S. patent application Ser. No. 14/359,027 by Xiaoyi Zheng et al. under the title "HOLOGRAPHIC REPRODUCING APPARATUS AND METHOD, HOLOGRAPHIC IMPLEMENTING DEVICE AND METHOD".

TECHNICAL FIELD

The present disclosure relates to the field of display technique, and particularly to a holographic reproducing apparatus, a holographic reproducing method, a holographic implementing device and a holographic implementing method.

BACKGROUND

In the linear optical material, for example, a lens, a prism and the like, the light beam only passes through the optical material and does not change a certain property of the optical material itself. The effect in which the refractivity of the material is changed by the light is referred to as the photorefractive effect in short. However, the photorefractive effect particularly refers to the effect in which a charge field is formed by the photoelectric effect when the optical material is radiated by the light beam and then the refractivity of the optical material varies with the distribution of the light intensity in space due to the photoelectric effect rather than refers to all the changes of the refractivity induced by the light beam. Since the optical property of the photorefractive crystal can be changed by the light beam passing through the optical material, and thus such optical material belongs to non-linear optical material. Similar to the film photosensitizer used in the usual photography, the photorefractive crystal can record an intricate pattern of the light; further, the photorefractive crystal has more advantages over the film in performance, such as large capacity, real-time property, recyclable property, easy to be preserved and the like; for example, an image of the light beam recorded in the photorefractive crystal can be erased, while the film only records an image once being exposed and the image recorded can not be erased; further, for instance, the photorefractive crystal can store 5,000 different images in a volume of 3 $cm^3$, and can display any one of the images quickly.

Holography refers to all the information of the light wave, i.e., the amplitude information and the phase information of the light wave. The normal photography only records the intensity information of the light wave (i.e. the amplitude information) but loses the phase information of the light wave. Since the image reproduced by the holography has a strong stereoscopic sense, the three-dimensional (3D) display based on the holography has gained more and more attention. The holographic 3D display technique mainly comprises the synthetic holography 3D display, the digital holography 3D display and the holographic 3D display based on the photorefractive crystal. The holographic 3D display technique based on the photorefractive crystal utilizes the property of the photorefractive effect of the photorefractive crystal, and all the information (the amplitude information and the phase information) of the object light wave is stored in the recordable medium when it is recorded according to the interference principle; when the recordable medium is radiated by the reproducing light wave, the original object light wave is reproduced according to the diffraction principle, so that an vivid stereoscopic image is reproduced.

In the 3D display technique based on the photorefractive crystal in the prior art, when the information is recorded in holography, the coherent reference light beam and object light beam are incident to the photorefractive crystal in different angles, and interference fringes are generated at the portions where the reference light beam and the object light beam intersect; the information is recorded in the photorefractive crystal by means of the photorefractive effect, and a holographic image is formed. When it is reproduced in holography, the incident angle, the frequency and the optical path of the reference light beam are maintained unchanged, and the reference light beam is incident to the photorefractive crystal having the holographic image recorded therein as a reproducing light beam, so that an observer located in a certain orientation (which guarantees that the observer is roughly located in the angle at which the object light beam is incident to the photorefractive crystal when the holographic image is formed) views an image recorded in the photorefractive crystal; then the photorefractive crystal is rotated and the reproducing light beam is maintained unchanged, so that the observer views another holographic image recorded in the photorefractive crystal.

SUMMARY

Embodiments of the present disclosure relates to the field of the display technique, and particularly to a holographic reproducing apparatus, a holographic reproducing method, a holographic implementing device and a holographic implementing method, enabling observers located in a plurality of orientations to view the holographic images recorded in the photorefractive crystal, which addresses the problem that the angle for viewing is unique in the holographic reproducing procedure.

The technical solutions of the embodiments of the present disclosure are as follows.

In the embodiments of the present disclosure, there is provided a holographic reproducing apparatus comprising: a photorefractive crystal configured to have holographic images recorded in a plurality of different angles respectively; and a light source configured to supply reproducing light beams to be incident to the photorefractive crystal in different angles, wherein the reproducing light beams have a same frequency and a same optical length as a reference light beam used when the holographic images are formed.

Optionally, the light source is connected to a first driving mechanism, and the first driving mechanism drives the light source to move on a circular arc with the photorefractive crystal as a center.

Optionally, a reflective mirror is arranged on an optical path of the reproducing light beam between the light source and the photorefractive crystal, and the reflective mirror reflects the reproducing light beam emitted from the light source to the photorefractive crystal.

Optionally, the reflective mirror is connected to a second driving mechanism, and the second driving mechanism drives the reflective mirror to move on an elliptical arc with the light source and the photorefractive crystal as the focuses.

Optionally, the light source and the reflective mirror are connected to a third driving mechanism, and the third driving mechanism drives the light source and the reflective mirror to move on the circular arc with the photorefractive crystal as a center, wherein a relative position between the light source and the reflective mirror is kept unchanged during the movement.

Optionally, the light source comprises a plurality of light sources, and the reproducing light beams provided by different light sources are incident to the photorefractive crystal in different angles.

Optionally, the light source comprises: a laser instrument configured to supply a laser and a beam splitter arranged on an optical path of the laser, wherein the beam splitter splits the laser into reproducing light beams to be incident to the photorefractive crystal and non-reproducing light beam to be incident to other ranges.

Optionally, an optical absorption plane is arranged on an optical path of the non-reproducing light beam, and the optical absorption absorbs the non-reproducing light beam.

Optionally, the light source comprises a laser instrument configured to supply the laser and a light splitting mechanism arranged on an optical path of the laser, wherein a plurality of reproducing light beams to be incident to the photorefractive crystal in different angles are formed from the laser under the effect of the light splitting mechanism.

Optionally, a collimating and beam expanding mechanism is arranged on the optical path of the reproducing light beam between the light source and the photorefractive crystal for collimating and expanding the incident light.

Optionally, an incident angle range of the reproducing light beam is adapted to the angle range of the photorefractive crystal in rotation when the holographic images are formed.

According to embodiments of the present disclosure, there is further provided a holographic implementing device, and the holographic implementing device comprises a holographic recording apparatus and a holographic reproducing apparatus; wherein the holographic reproducing apparatus is any one of the holographic reproducing apparatuses as described above.

Optionally, the holographic recording apparatus comprises: a light source configured to supply a reference light beam to be incident to a photorefractive crystal and an object light beam to be incident to the subject, wherein the reference light beam and the object light beam are coherent; the photorefractive crystal configured to receive the reference light beam and the object light beam reflected by the subject to record holographic images; and a first rotation mechanism configured to rotate the photorefractive crystal by a preset angle after the photorefractive crystal records a holographic image every time.

Optionally, the holographic recording apparatus further comprises a second rotation mechanism for rotating the subject by a preset angle after the photorefractive crystal records a holographic image every time.

Optionally, the light source of the holographic recording apparatus comprises a laser instrument configured to supply the laser and a beam splitter arranged on the optical path of the laser, wherein the beam splitter splits the laser into the reference light beam to be incident to the photorefractive crystal and the object light beam to be incident to the subject.

According to the embodiments of the present disclosure, there is further provided a holographic reproducing method based on any one of the holographic reproducing apparatus as described above, the holographic reproducing method comprises: for the photorefractive crystal having holographic images recorded therein in a plurality of different angles respectively, supplying a plurality of reproducing light beams to be incident to the photorefractive crystal in different angles, so that the observers in a plurality of different orientations can view the holographic images respectively; wherein the reproducing light beams have a same frequency and a same optical length as the reference light beam used when the holographic images are formed.

Optionally, a plurality of reproducing light beams are supplied to be incident to the photorefractive crystal in different angles sequentially, so that the observers in a plurality of different orientations can view the holographic images respectively sequentially.

Optionally, a plurality of reproducing light beams are supplied to be incident to the photorefractive crystal in different angles simultaneously, so that the observers in a plurality of different orientations can view the holographic images respectively simultaneously.

The embodiments of the present disclosure further provides a holographic implementing method, the holographic implementing method comprising steps for holographic recording and steps for holographic reproducing; and the steps for holographic reproducing are achieved by the above holographic reproducing method.

Optionally, the holographic recording method comprises: S1, making the reference light beam and the object light beam reflected by the subject be incident to the photorefractive crystal in different angles, to record of a holographic image in the photorefractive crystal, wherein the reference light beam and the object light beam are coherent; S2, keeping the reference light beam and the object light beam unchanged, and rotating the photorefractive crystal by a preset angle, repeating step S1, and recording a next holographic image in the photorefractive crystal.

Optionally, in the step S2, while the photorefractive crystal is rotated by the preset angle, the subject is rotated by a preset angle.

In the holographic reproducing apparatus provided in the embodiments of the present disclosure, a plurality of reproducing light beams to be incident to the photorefractive crystal radiate the photorefractive crystal in different angles; since the photorefractive crystal records the holographic images in different angles, and each of the holographic images can be represented in different angles without interference therebetween, so that the observers in a plurality of orientations can view the holographic images recorded in the photorefractive crystal, thus the problem that the viewing angle is unique in the holographic reproducing procedure is addressed.

REFERENCE SIGNS

Figure 1:
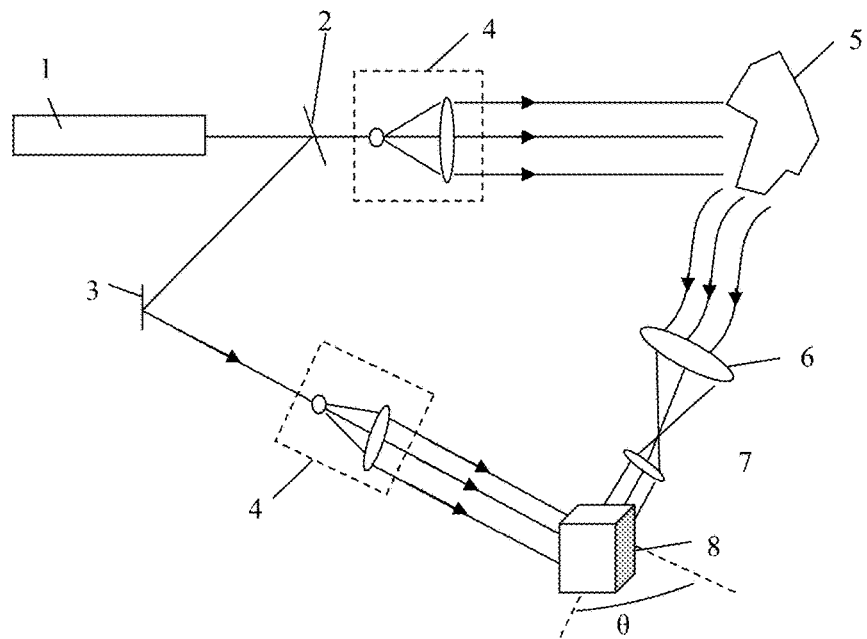
FIG. 1 is a diagram showing an optical path of a holographic recording apparatus according to a first embodiment of the present disclosure.

1: laser instrument; 2: beam splitter; 3: reflective mirror; 4: collimating and beam expanding mechanism; 5: subject;

6: large aperture convex lens; 7: small aperture convex lens; 8: photorefractive crystal; 9: optical absorption plane; 11: first reproducing light beam; 12: second reproducing light beam; 13: third reproducing light beam.

DETAILED DESCRIPTION OF THE PREFERRED EMBODIMENTS

Further descriptions will be given to the implementations of the present disclosure in connection with the accompanying drawings and the embodiments. The following embodiments are only used for illustrating the aspects of the present disclosure rather than for limiting the scope of the present disclosure.

The implementation of the holography generally comprises two main portions, i.e., the holographic record and the holographic reproduction; that is, the photorefractive crystal having holographic images recorded therein is obtained by the holographic record, and the holographic images recorded in the photorefractive crystal are reproduced by the holographic reproduction. Hereinafter, from the holographic recording portion to the holographic reproducing portion, detailed descriptions will be given to the holographic reproducing apparatus, the holographic reproducing method, the holographic implementing device and the holographic implementing method provided in the embodiments of the present disclosure.

First Embodiment

According to the present embodiment, there are provided a holographic recording apparatus and a holographic recording method, which can be used for obtaining the photorefractive crystal having the holographic images recorded therein as required in a second embodiment.

The holographic recording apparatus provided in the present embodiment mainly comprises: a light source configured to supply a reference light beam to be incident to a photorefractive crystal and an object light beam to be incident to a subject, wherein the reference light beam and the object light beam are coherent; the photorefractive crystal configured to receive the object light beam reflected by the subject and the reference light beam to form a holographic image; and a first rotation mechanism configured to rotate the photorefractive crystal by a preset angle after the photorefractive crystal records one holographic image every time.

The holographic recording method provided in the present embodiment mainly comprises: making the object light beam reflected by the subject and the reference light beam be incident to the photorefractive crystal in different angles so as to record one holographic image in the photorefractive crystal; wherein the reference light beam and the object light beam are coherent; maintaining the reference light beam and the object light beam unchanged, and rotating the photorefractive crystal by a preset angle; and repeating the above steps to record a next holographic image in the photorefractive crystal.

Hereinafter, the detailed illustration will be given to the holographic recording apparatus and the holographic recording method provided in the present embodiment with reference to FIG. 1.

As shown in FIG. 1, the light source supplies the reference light beam to be incident to the photorefractive crystal 8 and the object light beam to be incident to the subject 5, wherein the reference light beam and the object light beam are coherent so that an interference can occur. Since the laser has a good performance in mono-chromaticity and is a high coherent light, the object light beam and the reference light beam are formed from splitting a same laser beam in the present embodiment. For example, a laser beam is firstly supplied by a laser instrument 1 and then the laser beam supplied by the laser instrument 1 is split in a certain splitting ratio by a beam splitter 2 or other optical elements (e.g. a prism); the splitting ratio of the beam splitter 2 is normally equal to 1:2, 1:1 and the like. In normal conditions, the optical path of the object light beam is more complex, since the object light beam needs to pass through a plurality of lens and to be reflected on the surface of the subject 5, the loss of light intensity is very serious, and thus the beam having a large light intensity is preferred as the object light beam. After the incident laser is beam-split by the beam splitter 2, transmitted light beam and reflected light beam with a certain angle therebetween (normally, the effect is optimum when the angle is equal to 30°) are generated from the incident laser. In the present embodiment, the transmitted light beam is the object light beam and the reflected light beam is the reference light beam.

For facilitating the reference light beam emitted from the beam splitter 2 to be incident to the photorefractive crystal 8, more important is in that, for controlling the optical path length difference between the reference light beam and the object light beam easily, a reflective mirror 3 is arranged in the optical path of the reference light beam between the light source and the photorefractive crystal 8. On one hand, the reflective mirror 3 can change the propagation direction of the reference light beam, so that the reference light beam is reflected to the photorefractive crystal 8. On the other hand, by changing the position of the reflective mirror 3, the optical path length of the reference light beam can be adjusted conveniently so as to change the optical path length difference between the reference light beam and the object light beam. Only the optical path length difference between the reference light beam and the object light beam needs to be maintained at constant or at zero, can the phase of the reference light beam and that of the object light beam be identical or can the phase difference between the reference light beam and the object light beam be constant, so as to guarantee that the inference can occur between the reference light beam and the object light beam. In order to reduce the computation, in the present embodiment, the optical path length of the reference light beam and that of the object light beam are substantially consistent with each other, and the effect is optimum when they are identical. In the case in which the optical path length of the reference light beam and that of the object light beam are substantially consistent with each other, the optical path length difference should not be too large, and the difference range depends on the coherent length of the laser instrument 1 generating the laser. For example, in general, the optical path length difference needs to be controlled within 3 cm, then the interference can occur; otherwise, it is difficult for the interference to occur, and it is impossible to complete the recording of the holographic image.

Since the base mode of the laser is generally a Gaussian light beam, the emitted laser is neither a plane wave, nor a spherical wave; in order to form parallel light beams by the object light beam and the reference light beam, in the present embodiment, collimating and beam expanding mechanisms 4 are arranged in the optical path of the object light beam and that of the reference light beam respectively. For example, a collimating and beam expanding mechanism 4 is arranged in the optical path of the reference light beam between the reflective mirror 3 and the photorefractive crystal 8, and the reference light beam is reflected by the reflective mirror 3 and enters into the collimating and beam expanding mechanism 4 where the reference light beam reflected by the reflective mirror 3 is collimated and expanded so as to be converted to a parallel light beam (the plane light wave) to be incident to the photorefractive crystal 8. Further, for example, a collimating and beam expanding mechanism 4 is also arranged in the optical path of the object light beam between the beam splitter 2 and the subject 5, and the object light beam transmitted from the beam splitter 2 enters into the collimating and beam expanding mechanism 4 where the object light beam transmitted from the beam splitter 2 is collimated and expanded so as to be converted to a parallel light beam (the plane light wave) to be incident to the surface of the subject 5.

The object light beam can be diverged in a plurality of directions after being diffusely reflected by the subject 5. In order to make the object light beam be incident to the photorefractive crystal 8 as much as possible, an optical convergence mechanism is arranged in the optical path of the object light beam between the subject 5 and the photorefractive crystal 8, and the object light beam reflected by the subject 5 is converged by the optical convergence mechanism and then is incident to the photorefractive crystal 8. The optical convergence mechanism can be implemented in many manners, and one of the manners is in that a pair of convex lenses opposite each other are arranged in the optical path of the object light beam between the subject 5 and the photorefractive crystal 8, one is a large aperture convex lens 6, and the other is a small aperture convex lens 7, the aperture of the convex lens closer to the subject 5 is larger than that of the other convex lens, and the distance between the two convex lenses is a sum of focal lengths of the two convex lens. That is, the focal point of the large aperture convex lens 6 overlaps the focal point of the small aperture convex lens 7 on the opposite side. Therefore, the object light beam diffusely reflected by the subject 5 is converged by the large aperture convex lens 6 as much as possible, and the object light beam converged by the large aperture convex lens 6 is focused on the overlapped focus points, and then a parallel light beam with a small diameter is formed by the small aperture convex lens 7 to be incident to the photorefractive crystal 8.

In order to improve the interference effect of the reference light beam and the object light beam, the optical spots on the photorefractive crystal 8 formed by the reference light beam and the object light beam respectively should have a same size as much as possible. At the same time, to ensure the integrity of the holographic image, the optical spots on the photorefractive crystal 8 formed by the reference light beam and the object light beam respectively should be integral as much as possible, that is, the optical spots fall on the photorefractive crystal 8 completely; otherwise, if the optical spots on the photorefractive crystal 8 formed by the reference light beam and the object light beam respectively go beyond the edge of the photorefractive crystal 8, it is sure that the recorded holographic image is incomplete. Since the photorefractive crystal 8 is small in size, and normally, it's diameter is lower than 1 cm; it is necessary to control and adjust the sizes of the optical spots on the photorefractive crystal 8 formed by the reference light beam and the object light beam to avoid the optical spots going beyond the edge of the photorefractive crystal 8. It can be seen that in order to control the sizes of the optical spots on the photorefractive crystal 8 formed by the reference light beam and the object light beam respectively, it is very important to select the lens in the collimating and beam expanding mechanism 4 and to select the large aperture convex lens 6 and the small aperture convex lens 7. If it is difficult to obtain optical spots in a specific size by the selection of the lens and the convex lenses, it is necessary to arrange optical spot adjustment mechanisms in the optical path of the reference light beam between the collimating and beam expanding mechanism 4 and the photorefractive crystal 8 and in the optical path of the object light beam between the subject 5 and the photorefractive crystal 8 respectively, for adjusting the sizes of the optical spots on the photorefractive crystal 8 formed by the reference light beam and the object light beam. In the present embodiment, the above optical spot adjustment mechanism includes a pinhole diaphragm in the optical path of the reference light beam between the collimating and beam expanding mechanism 4 and the photorefractive crystal 8 and a pinhole diaphragm in the optical path of the object light beam between the subject 5 and the light source, and it is convenient to control the sizes of the optical spots on the photorefractive crystal 8 formed by the reference light beam and the object light beam respectively by adjusting the apertures of the pinhole diaphragms for passing the light beam.

After the reference light beam and the object light beam are incident to the photorefractive crystal 8, an interference pattern is generated on the convergence portion of the reference light beam and the object light beam, and the photorefractive crystal 8 can record the interference pattern, i.e., the holographic diagram containing all the information of the subject 5, by means of the photorefractive effect. After one holographic image is recorded completely, the reference light beam and the object light beam are maintained unchanged, and the photorefractive crystal 8 is rotated by a preset angle via a first rotation mechanism; and the above steps are repeated, and a next holographic image is recorded in the photorefractive crystal 8; in this way, the same holographic image is recorded in the photorefractive crystal 8 in respective angles. In the present embodiment of the present disclosure, a second rotation mechanism is further arranged. After the photorefractive crystal 8 has recorded a holographic image every time, in addition to rotating the photorefractive crystal 8 by a preset angle via the first rotation mechanism, the subject 5 is rotated by a preset angle via the second rotation mechanism; that is, both the subject 5 and the photorefractive crystal 8 are rotated by certain preset angles, so that different holographic images are recorded on the photorefractive crystal 8 in different angles, thus the information which can be represented is more comprehensive. The above first rotation mechanism and the second rotation mechanism can be implemented in many manners. In the present embodiment, the first rotation mechanism mainly comprises a supporting platform for supporting the subject 5, and the second rotation mechanism mainly comprises a supporting platform for supporting the photorefractive crystal 8, wherein each of the supporting platforms is connected to a servo motor respectively, and the servo motor drives the supporting platforms to rotate the subject 5 and the photorefractive crystal 8 respectively. After all the holographic images as required are recorded completely, a set of holographic images representing omnioriental information of the subject 5 are recorded in the photorefractive crystal 8 in different angles.

By means of the holographic recording apparatus and the holographic recording method provided in the present embodiment, the photorefractive crystal 8 having the holographic images recorded therein in a plurality of angles can be obtained. In cooperation with the holographic reproducing apparatus and the holographic reproducing method provided in a second embodiment described as below, it is possible to reproduce each of the holographic images in different angles without interfering with each other in the holographic reproduction, so that observers located in a plurality of orientations can view the holographic images recorded in the photorefractive crystal 8.

Second Embodiment

According to the present embodiment, there are provided a holographic reproducing apparatus and a holographic reproducing method for reproducing the holographic images recorded by the holographic recording apparatus and the holographic recording method provided in the first embodiment of the present disclosure. Of course, the holographic reproducing apparatus and the holographic reproducing method in the present embodiment can also be used for reproducing the holographic images recorded by the holographic recording apparatus and the holographic recording method other than those provided in the first embodiment.

The holographic reproducing apparatus provided in the second embodiment mainly comprises: a photorefractive crystal having holographic images recorded in a plurality of different angles respectively; a light source configured to supply a plurality of reproducing light beams to be incident to the photorefractive crystal in different angles. The reproducing light beams have a same frequency and a same optical length as the reference light beams used when the holographic images are formed.

The holographic reproducing method mainly comprises: supplying a plurality of reproducing light beams to be incident to the photorefractive crystal in different angles. The reproducing light beams have a same frequency and a same optical length as the reference light beams used when the holographic images are formed. The photorefractive crystal have holographic image recorded in a plurality of different angles respectively.

Figure 2:
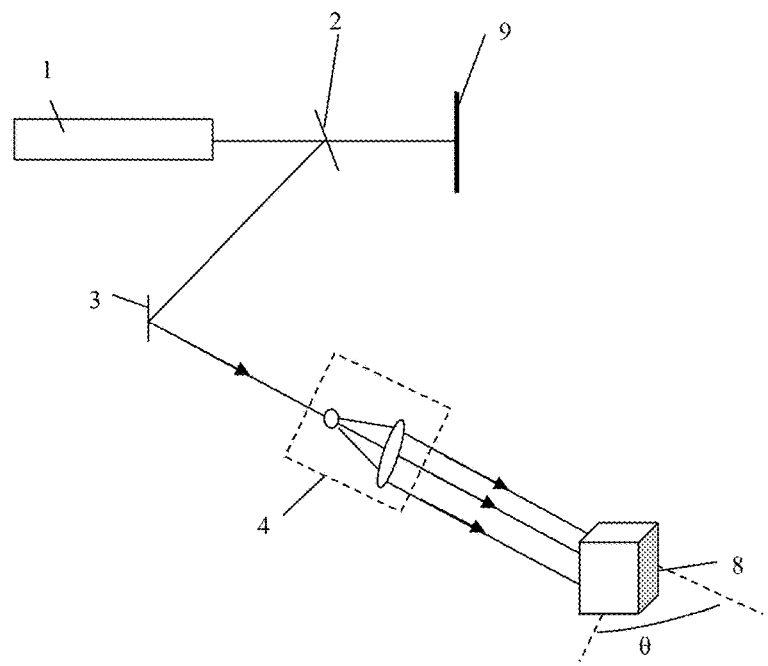
FIG. 2 is a diagram showing an optical path of a holographic recording apparatus according to a second embodiment of the present disclosure.

Hereinafter, detailed descriptions will be given to the holographic reproducing apparatus and the holographic reproducing method in the present embodiment with reference to FIG. 2.

In order to ensure the consistence between the frequency of the reproducing light beam and that of the reference light beam used when the holographic images are formed, the light source in the present embodiment can be the light source provided in the first embodiment, that is, the laser is supplied by the laser instrument 1 firstly, and then is split by the beam splitter 2 in the splitting ratio used in the first embodiment; after the incident laser is split by the beam splitter 2, a transmitted light beam and a reflected light beam with a certain angle inbetween are formed; wherein the reflected light beam is the reproducing light beam and the transmitted light beam is a non-reproducing light beam. In order to avoid the damage caused by the non-reproducing light beam to the nearby objects, a light absorption plane 9 is arranged in the optical path of the non-reproducing light beam in the present embodiment, and the light absorption plane 9 can absorb the non-reproducing light beam so as to avoid the potential risk. The light absorption plane 9 can be implemented by a baffle plate covered by a light absorption material. Similar to the first embodiment, in the present embodiment, a collimating and beam expanding mechanism 4 for collimating and expanding the incident light, a reflective mirror 3, and other optical elements can be arranged in the optical path of the reproducing light beam between the light source and the photorefractive crystal 8.

For how the light source to provide the reproducing light beams to be incident to the photorefractive crystal 8 in different angles, it is possible that the light source provides a plurality of reproducing light beams to be incident to the photorefractive crystal in different angles sequentially so that observers in a plurality of different orientations can view the holographic images respectively sequentially, and it is also possible that the light source provides a plurality of reproducing light beams to be incident to the photorefractive crystal in different angles simultaneously so that the observers in a plurality of different orientations can view the holographic images respectively simultaneously.

Figure 3:
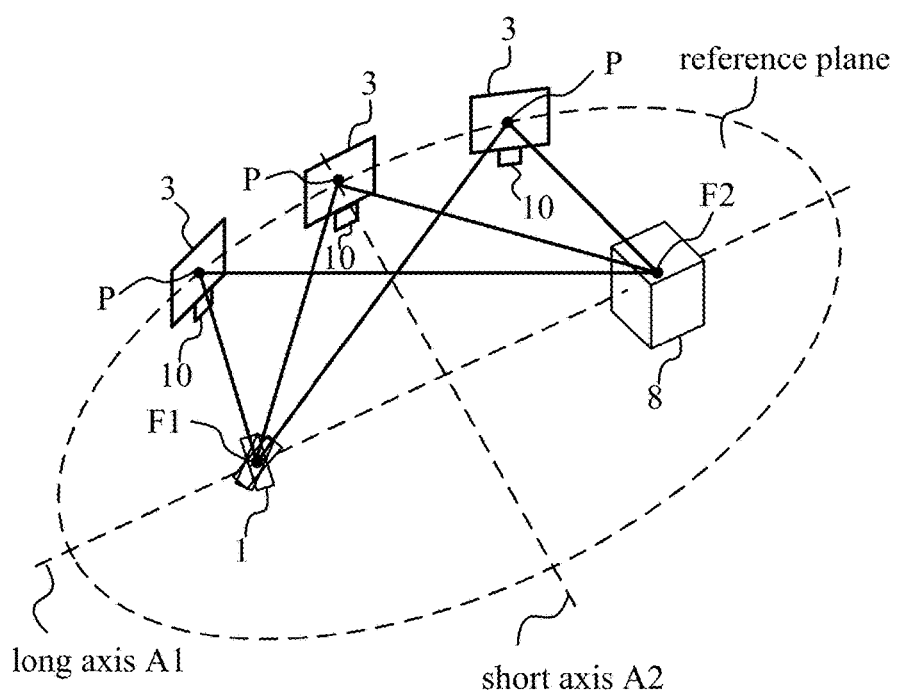
FIG. 3 is a diagram showing an elliptical arc trajectory of the holographic recording apparatus according to a second embodiment of the present disclosure.

For example, FIG. 3 shows an embodiment in which a light source 1 provides a plurality of reproducing light beams to be incident on the photorefractive crystal 8 from different angles. The elliptical arc shown in FIG. 3 is one planar elliptical arc. This elliptical arc is defined, for example, by using two mathematical focuses F1 and F2 and a constant a. As can be known from the ellipse's mathematical definition, the elliptical arc is a trajectory of a moving point P, a sum of the distances from which point P to a fixed point F1 (first focus F1) and a fixed point F2 (second focus F2) within the plane equals to 2* the constant a. That is, the mathematical expression of this elliptical arc is: $|PF1|+|PF2|=2a$ ($2a>|F1F2|$), a is the constant. A value of the constant a may be set as needed.

For example, the value of the constant a may be determined according to a size of the holographic reproducing apparatus and positional relationship among respective components. When the size of the holographic reproducing apparatus is relatively large, the size of the elliptical arc may be set as relatively large, thus the constant a may be set as a relatively large constant. When the size of the holographic reproducing apparatus is relatively small, the size of the elliptical arc may be set as relatively small, thus the constant a may be set as a relatively small value. In addition, the size of the constant a may also be set in consideration of positional relationship of respective components of the holographic reproducing apparatus, so that the elliptical arc defined by the two focuses and the constant a enables the holographic reproducing apparatus to operate normally.

In this embodiment, the light source 1 is, for example, placed on the first focus F1 of the elliptical arc, and the photorefractive crystal 8 is, for example, placed on the second focus F2. In other words, the planar elliptical arc is defined using the light source 1 and the photorefractive crystal 8 as two mathematical focuses. For convenience of description, it is assumed that a mass center of the light source 1 is located at the focus F1, and a mass center of the photorefractive crystal 8 is located at the focus F2.

The reflective mirror 3 is arranged on an optical path of the reproducing light beam between the light source 1 and the photorefractive crystal 8, and the reflection mirror 3 reflects the reproducing light beam emitted from the light source 1 to the photorefractive crystal 8. For example, the reflective mirror 3 may be arranged on the elliptical arc indicated by dashed line in the figure. In this case, the reflective mirror 3 may be connected to a second driving mechanism 10, and the second driving mechanism 10 is used to drive the reflective mirror 3 to move in the elliptical arc trajectory on the reference plane which uses the light source 1 and the photorefractive crystal 8 as the two mathematical focuses. The optical path of the reproducing light beam from the light source 1 to the photorefractive crystal 8 is the distance PF1 from the light source 1 to the reflective mirror 3 plus the distance PF2 from the reflective mirror 3 to the photorefractive crystal 8, and it can be known from the ellipse's mathematical definition provided above that, optical paths of different reproducing light beams all are |PF1|+|PF2|=2a, thereby it is ensured that different reproducing light beams have the same optical path. For example, the three reproducing light beams 11, 12 and 13 have the same optical path.

The second driving mechanism 10 may be any motor-driven device that can drive the reflective mirror 3 connected thereto to move along the planar elliptical arc shown in FIG. 3 according to a control instruction. In one embodiment, the planar elliptical arc can be a planar elliptical track. As shown in FIG. 3, the reflective mirror 3 may be arranged on the second driving mechanism 10, then the second driving mechanism 10 carries the reflective mirror 3 to move along the planar elliptical arc according to the control instruction. The control instruction includes, for example, parameters of the planar elliptical arc, such as positions of the focuses, value of the constant a, movement speed of the reflective mirror on the elliptical arc, and the like.

For example, as shown in FIG. 3, it is assumed that the reflective mirror 3 is set as a reference plane vertical to the elliptical arc, and a center of the reflective mirror 3 is located on the reference plane. When the reflective mirror 3 moves on the elliptical arc described above, the second driving mechanism 10 can adjust an angle of the reflective mirror 3 while driving the reflective mirror 3 to move along the elliptical arc according to the control instruction, thereby ensuring that the light beam from the light source 1 is correctly reflected to the photorefractive crystal 8.

Figure 4:
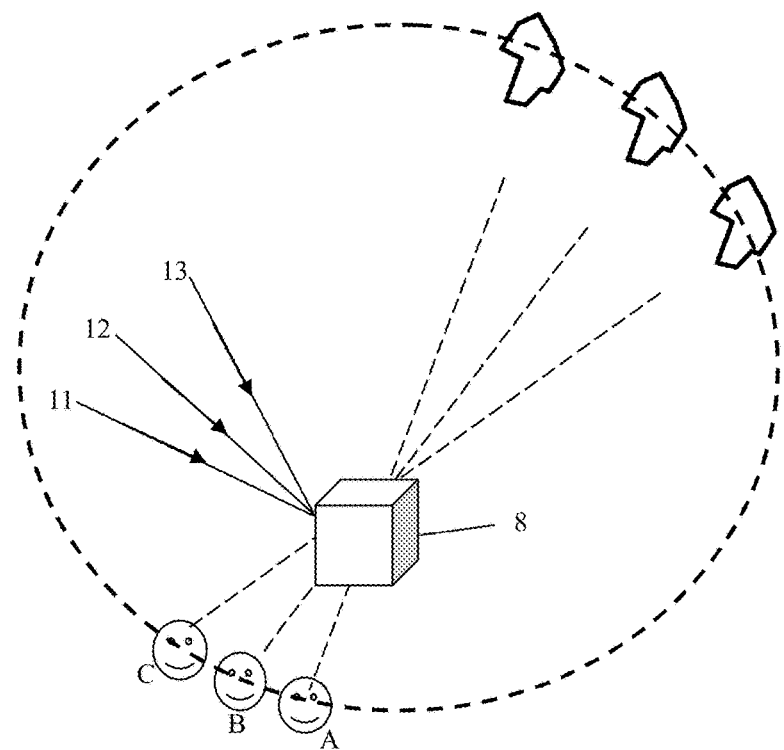
FIG. 4 is a schematic diagram showing the holographic reproduction according to the second embodiment of the present disclosure.
Figure 5:
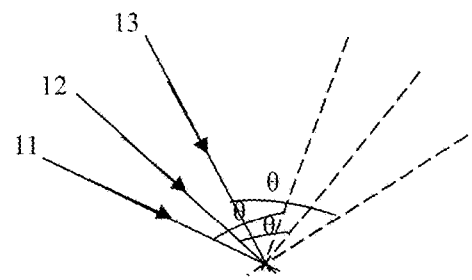
FIG. 5 is a schematic diagram illustrating incident angles of the reproducing light beams shown in FIG. 4.

Therefore, as shown in FIG. 3, as the reflective mirror 3 moves on the elliptical arc, the incident angle of the reproducing light beam to be incident to the photorefractive crystal 8 varies continuously, and each of the holographic images recorded is displayed in the different orientations sequentially without interfering with each other, so that the observers in a plurality of orientations can view the holographic images recorded in the photorefractive crystal 8 sequentially. For example, as shown in FIGS. 4 and 5, a first reproducing light beam 11 is incident to the photorefractive crystal 8 in a certain incident angle, and at this time, an observer in a location A can view a holographic image recorded in the photorefractive crystal 8; after the first reproducing light beam 11 rotates a preset angle in a clockwise direction to form a second reproducing light beam 12, and at this time, an observer in a location B can view a holographic image recorded in the photorefractive crystal 8; after the second reproducing light beam 12 rotates a preset angle in a clockwise direction to form a third reproducing light beam 13, and at this time, an observer in a location C can view a holographic image recorded in the photorefractive crystal 8. Such an implementation is easy to be achieved and the corresponding apparatus has a simple structure.

a reflective mirror 3 is arranged in the optical path of the reproducing light beam between the light source and the photorefractive crystal 8, and the reflective mirror 3 reflects the reproducing light beam emitted from the light source to the photorefractive crystal 8. At this time, the reflective mirror 3 can be connected to a second driving mechanism, and the second driving mechanism drives the reflective mirror 3 to move on an elliptical arc with the light source and the photorefractive crystal 8 as it's focuses, so as to guarantee that the different reproducing light beams have the same optical length. As the reflective mirror 3 moves on the elliptical arc, the incident angle of the reproducing light beam to be incident to the photorefractive crystal 8 varies continuously, and each of the holographic images recorded is displayed in the different orientations sequentially without interfering with each other, so that the observers in a plurality of orientations can view the holographic images recorded in the photorefractive crystal 8 sequentially. For example, as shown in FIGS. 3 and 4, a first reproducing light beam 11 is incident to the photorefractive crystal 8 in a certain incident angle, and at this time, an observer in a location A can view a holographic image recorded in the photorefractive crystal 8. After the first reproducing light beam 11 rotates a preset angle in a clockwise direction to form a second reproducing light beam 12, and at this time, an observer in a location B can view a holographic image recorded in the photorefractive crystal 8. After the second reproducing light beam 12 rotates a preset angle in a clockwise direction to form a third reproducing light beam 13, and at this time, an observer in a location C can view a holographic image recorded in the photorefractive crystal 8. Such an implementation is easy to be achieved and the corresponding apparatus has a simple structure.

Further, for instance, in a case that there is no reflective mirror 3 arranged on the optical path of the reproducing light beam between the light source and the light refractive crystal 8, the light source can be connected to the first driving mechanism, and the first driving mechanism drives the light source to move on a circular arc with the photorefractive crystal 8 as a center. As the light source moves on the circular arc with the photorefractive crystal 8 as the center, the angle of the reproducing light beam provided by the light source to be incident to the photorefractive crystal 8 varies continuously, so that observers in a plurality of orientations can view the holographic images recorded in the photorefractive crystal 8 sequentially. As an alternative, in a case that a reflective mirror 3 is arranged on the optical path of the reproducing light beam between the light source and the light refractive crystal 8, both the light source and the reflective mirror 3 can be connected to a third driving mechanism, and the third driving mechanism drives the light source and the reflective mirror 3 to move together on the circular arc with the photorefractive crystal 8 as the center. The relative position between the light source and the reflective mirror 3 is kept unchanged during the movement. In such a way, the incident angle of the reproducing light beam to the photorefractive crystal 8 can also vary, so that the observers in a plurality of orientations can view the holographic images recorded in the photorefractive crystal 8 sequentially.

In addition, for example, it is possible to arrange a plurality of identical light sources, and the plurality of light sources provide the reproducing light beams to be incident to the photorefractive crystal 8 in different angles. Since there are a plurality of reproducing light beams with different incident angles incident to the photorefractive crystal 8 simultaneously, observers in a plurality of orientations can view the holographic images recorded in the photorefractive crystal 8 simultaneously. As an alternative, it is possible that the light source comprises a laser instrument providing the laser and a light splitting mechanism arranged on the optical path of the laser. In the effect of the light splitting mechanism, a plurality of reproducing light beams to be incident to the photorefractive crystal in different angles are formed from the laser. In such a way, the effect of a plurality of light sources is achieved by one light source, so as to simplify the structure of the holographic reproducing apparatus.

The holographic images viewed by the observers in the different orientations can be identical or be different, depending on the manner in which the holographic images are recorded. For example, according to the first embodiment, after each of the holographic images is recorded completely, in a recording manner in which the reference light beam and the object light beam are kept unchanged, and only the photorefractive crystal 8 is rotated by a preset angle via the first rotation mechanism and the subject is not rotated, the observers in different orientations can view the identical holographic image. In other hand, according to the first embodiment, after each of the holographic images is recorded completely, in a recording manner in which the reference light beam and the object light beam are kept unchanged, and the photorefractive crystal 8 is rotated by a preset angle via the first rotation mechanism and at the same time the subject is rotated by a preset angle via the second rotation mechanism, the observers in different orientations can view the holographic images of the subject in different angles.

When the holographic images are recorded in the holographic refractive crystal 8, not all of the angle ranges along the perimeter of the photorefractive crystal 8 are used for recording the holographic images. For example, only a quarter or less of the angle range along the perimeter of the photorefractive crystal 8 is used for recording the holographic images. If the reproducing light beam is incident to the three-quarter of the angle range or a larger angle range along the perimeter of the photorefractive crystal 8 without the holographic image recorded, the observer cannot view the holographic images; such operation only increases the power consumption for supplying the reproducing light beam. Therefore, in the present embodiment, the angle range of the reproducing light beam is adapted to the angle range of photorefractive crystal 8 having the holographic images recorded, that is, the angle range in which the reproducing light beam is incident is adapted to the angle range in which the photorefractive crystal 8 rotates when the holographic image is formed.

Third Embodiment

According to the present embodiment, there are provided a holographic implementing device and a holographic implementing method. The holographic implementing device comprises a holographic recording apparatus and a holographic reproducing apparatus, wherein the holographic recording apparatus is any one of the holographic recording apparatuses as above, and the holographic reproducing apparatus is any one of the holographic reproducing apparatuses as above. The holographic implementing method comprises steps for holographic recording and steps for holographic reproducing, wherein the steps for holographic recording are performed according to the holographic recording method as above, and the steps for holographic reproducing are performed according to the holographic reproducing method as above.

In the holographic recording apparatus and the holographic recording method provided in the embodiments of the present disclosure, the holographic images can be recorded in the photorefractive crystal in different angles respectively, and each of the holographic images can be represented in different angles without interference therebetween, so that observers in a plurality of orientations can view the holographic images recorded in the photorefractive crystal, thus the problem that the viewing angle is unique in the holographic reproducing procedure can be addressed.

The present disclosure can be widely used in museums, auctions and other occasions, so as to make it convenient for a plurality of persons in different orientations on site to appreciate the size, shape and other characteristics of the goods, and at the same time to eliminate the risks such as damages, thefts and the like which are prone to occur when the goods are represented directly.

It should be appreciated that the above embodiments are only for illustrating the principle of the present disclosure, and in no way limit the scope of the present disclosure. It will be obvious that those skilled in the art may make modifications, variations and equivalences to the above embodiments without departing from the spirit and scope of the present disclosure. Such variations and modifications are intended to be included within the spirit and scope of the present disclosure. Therefore, all the equivalent technical solutions belong to the protection scope of the present disclosure.

What is claimed is:

1. A holographic reproducing apparatus comprising:
a light source configured to supply a reproducing light beam to be incident to a photorefractive crystal, wherein the photorefractive crystal has holographic images recorded therein in a plurality of different angles respectively;
a reflective mirror configured to reflect the reproducing light beam emitted from the light source to the photorefractive crystal; and
a driving mechanism connected to the reflective mirror and configured to drive the reflective mirror to move on a plane elliptical arc, the plane elliptical arc is defined by using the light source and the photorefractive crystal as two mathematical focuses and using a predetermined constant, so that an incident angle of the reproducing light beam to be incident to the photorefractive crystal varies to form a plurality of reproducing light beams in different angles to be incident to the photorefractive crystal in sequence.

2. The holographic reproducing apparatus according to claim 1, wherein, for each of the holographic images recorded in the plurality of different angles respectively, the plurality of reproducing light beams have a same frequency and a same optical length as a reference light beam used when the holographic image is formed.

3. The holographic reproducing apparatus according to claim 1, wherein the reflective mirror is arranged on an optical path of the reproducing light beam between the light source and the photorefractive crystal.

4. The holographic reproducing apparatus according to claim 1, wherein the light source further comprises:
a laser instrument configured to supply a laser beam; and
a beam splitter arranged on the optical path of the laser beam, wherein the beam splitter is configured to split the laser beam into the reproducing light beam to be incident to the photorefractive crystal and a non-reproducing light beam to be incident to other ranges.

5. The holographic reproducing apparatus according to claim 1, wherein an incident angle range of the reproducing light beam is adapted to an angle range of the photorefractive crystal in rotation when holographic images are formed.

6. The holographic reproducing apparatus according to claim 1, wherein the predetermined constant is determined by size of the holographic reproducing apparatus and positional relationship between components of the holographic reproducing apparatus.

7. The holographic reproducing apparatus according to claim 1, wherein the driving mechanism is further configured to drive the reflective mirror according control information, the control information includes at least one of the following: positions information of the two focuses, a value of the constant, moving speed of the reflective mirror on the plane elliptical arc, the angle of the reflective mirror.

8. A holographic reproducing method comprising:

for a photorefractive crystal having holographic images recorded therein in a plurality of different angles respectively, supplying a plurality of reproducing light beams to be incident to the photorefractive crystal in different angles in sequence, so that the holographic images can be viewed in a plurality of different orientations sequentially;

wherein a reflective mirror is configured to reflect a reproducing light beam emitted from a light source to the photorefractive crystal and a driving mechanism is configured to drive the reflective mirror to move on a plane elliptical arc, the plane elliptical arc is defined by using the light source and the photorefractive crystal as two mathematical focuses and using a predetermined constant, so that an incident angle of the reproducing light beam varies to form the plurality of reproducing light beams in different angles to be incident to the photorefractive crystal in sequence.

9. The holographic reproducing method according to claim 8, wherein for each of the holographic images recorded in the plurality of different angles respectively, the plurality of reproducing light beams have a same frequency and a same optical length as a reference light beam used when the holographic image is formed.

\* \* \* \* \*